United States Patent [19]

Swiderski

[11] Patent Number: 5,224,734
[45] Date of Patent: Jul. 6, 1993

[54] GAS GENERATOR FOR AIR BAGS HAVING VERTICAL STACK ARRANGEMENT

[75] Inventor: Gregory Swiderski, Dublin, Ohio

[73] Assignee: Daicel Chemical Industries, Ltd., Tokyo, Japan

[21] Appl. No.: 865,358

[22] Filed: Apr. 8, 1992

[51] Int. Cl.$^5$ .................................. B60R 21/16
[52] U.S. Cl. ............................ 280/741; 422/305; 280/740
[58] Field of Search ................ 422/305, 165–167; 280/736, 741, 742, 743, 740

[56] References Cited

U.S. PATENT DOCUMENTS

| | | | |
|---|---|---|---|
| 3,532,360 | 10/1970 | Leising et al. | 280/150 |
| 3,618,980 | 11/1971 | Leising et al. | 280/150 |
| 3,632,132 | 1/1972 | Haas | 280/150 |
| 3,985,076 | 10/1976 | Schneiter | 102/39 |
| 4,131,299 | 12/1978 | Ono et al. | 280/736 |
| 4,278,638 | 7/1981 | Nilsson et al. | 422/166 |
| 4,296,084 | 10/1981 | Adams et al. | 423/151 |
| 4,530,516 | 7/1985 | Adams et al. | 280/741 |
| 4,547,342 | 10/1985 | Adams et al. | 422/166 |
| 4,561,675 | 12/1985 | Adams et al. | 280/734 |
| 4,578,247 | 5/1986 | Bolleau | 422/165 |
| 4,590,041 | 5/1986 | Hill | 422/165 |
| 4,722,551 | 2/1988 | Adams | 280/736 |
| 4,943,086 | 7/1990 | Cunningham | 280/741 |
| 5,062,367 | 11/1991 | Hayashi et al. | 280/741 |

FOREIGN PATENT DOCUMENTS

| | | | |
|---|---|---|---|
| 0416835 | 3/1991 | European Pat. Off. | 280/736 |
| 47-30045 | 11/1972 | Japan . | |
| 50-16057 | 6/1975 | Japan . | |
| 63-301144 | 12/1988 | Japan . | |
| 0092449 | 4/1991 | Japan | 280/736 |

Primary Examiner—Robert J. Warden
Assistant Examiner—Laura E. Collins

[57] ABSTRACT

The gas generator for air bags of the present invention includes a housing made up of first and second shells, each shell having a circular part and an outer wall formed along the periphery of the circular part. Installed in the housing is a gas generating device. Openings are formed in the first shell for establishing communication between a filter chamber in the hosing and an air bag. A partition member defines an annular space in the housing extending from a center tube installed at the center of the housing. A filter chamber is formed between the cylindrical wall portion of the partition member and the outer wall of the first shell in such a way that the filter chamber overlaps the combustion chamber in the axial direction along the outer circumference of the combustion chamber, whereby gases produced by the gas generating device on receiving impacts are introduced axially from the combustion chamber, through the filter chamber and into an air bag to protect a passenger from impacts.

18 Claims, 2 Drawing Sheets

GAS GENERATOR FOR AIR BAGS HAVING VERTICAL STACK ARRANGEMENT

BACKGROUND OF THE INVENTION

1. FIELD OF THE INVENTION

The present invention relates to a gas generator for air bags that protect passengers from impacts and more particularly to the novel structure of a gas generator which permits a reduction in the size of the gas generator.

2. PRIOR ART

The structure of a conventional gas generator typically includes a diffuser shell and a closure shell comprising a housing. A center cylindrical chamber for accommodating an ignition device is installed in the center of the housing. Around the center cylindrical chamber is provided a combustion chamber that contains a canister loaded with a gas generant. Further, around the combustion chamber is formed a coolant/filter chamber that accommodates a coolant and a filter.

In the conventional gas generator, the center cylindrical chamber, the combustion chamber, and the coolant/filter chamber are arranged concentrically and radially outwardly in the housing. This construction inevitably increases the diameter of the housing, which in turn increases the size of the gas generator and therefore requires a large number of rivets or other fastening means arranged along the circumferential direction of the housing to secure the sufficient strength of the housing. These rivets increase the weight of the gas generator and produce an idle space. No previous patents, taken either singly or in combination, teach or suggest the unique compact design of this invention, nor are any thought to provide the benefits of this invention.

U.S. Pat. No. 3,532,360 to Leising, et al, discloses a gas generating apparatus having a housing, a gas generating section, a coolant chamber, and inflatable air bag. The housing is generally bowl shaped and includes a bottom wall and a side wall. The gas generator is separated from an air bag by a plate having holes extending therethrough and a diaphragm which ruptures under pressure when the gas generant begins burning. The burning mixture is propelled into the air bag and continues to burn to achieve full inflation of the bag.

U.S. Pat. No. 3,618,980 to Leising, et al, discloses a gas generator having an ignitable propellant and a bag adapted to be inflated by gas released from the propellant. Also included is a trapping device for inhibiting movement of burning propellant from the gas generator to the interior of the bag. The trapping device includes a deflector which directs the propellant toward veins. The veins direct the materials towards the walls of the chamber in which they are positioned, causing the materials to travel in a generally circular pass, thereby enhancing combustion of the propellant. Because of their mass and velocity, reacting particles are kept in the chamber until fully consumed. A gas generator is contained in two housings that are connected together by plurality of fasteners.

U.S. Pat. No. 3,632,133 to Hass, discloses an inflatable air bag that includes a gas generator which, upon ignition, produces a high velocity gas stream directed into the converging end of a converging-diverging nozzle and then into the inflatable air bag. The high velocity stream of gas also influences the drawing of gas from the exterior of the gas generator into the air bag.

U.S. Pat. No. 3,985,076 to Schneiter et al, discloses a gas generator having an inner housing and an outer housing forming an annular chamber, having a central ignition means surrounded by a gas generant composition. The inner housing has a plurality of peripheral orifices. The inner housing is threadably engaged with the outer housing. The gas generant is surrounded by a diaphragm which is ruptured upon ignition. The resulting gases are then passed through a filter for solid particles, then through a pH neutralizing material and cooling device before being expelled into an inflatable structure.

U.S. Pat. No. 4,296,084 to Adams et al. discloses a method and apparatus for gas generation comprising a housing comprising an upper convex half shell threadably attached to a lower concave half shell. Within the housing is a combustion chamber having a gas generant, an igniter, a primary filter means in the combustion chamber comprised of a woven fabric which swells and becomes tacky at the temperature of the combustion process to retard the outflow from the combustion chamber of combustible products, and a secondary filter located outside of the combustion chamber.

U.S. Pat. No. 4,278,638 to Nilsson, et al, discloses a gas generator construction having a housing with a central tubular housing part which contains an ignition device, surrounded by a reaction chamber containing a gas generant, surrounded by a filter. The device includes a S-shaped wall member forming part of the reaction chamber, having an aperture through which gases flow to the expansion chamber.

U.S. Pat. No. 4,530,516 to Adams, et al, discloses a gas generator for use with an inflatable air bag comprising an upper shell and a lower shell welded together and an elongated steel center-tie member rigidly attached through the center of the housing having a hollow cylindrical perforated body containing an igniter charge assembly. Surrounding the center-tie member is an annular chamber containing a gas generant. After combustion of the gas generant, gases flow circumferentially through a screen filter and through a diffuser screen assembly, through exit ports of the housing into the air bag.

U.S. Pat. No. 4,547,342 to Adams, et al, discloses a gas generator for use with an inflatable air bag comprising a housing having an upper shell and a lower shell welded together. Within the housing are three integrally formed concentric cylinders defining chambers. A gas generant is contained in the combustion chamber. Upon ignition of the gas generant, gases flow through an inner screen filter pack radially outward through a combustion chamber exit where they are turned downward by a deflector ring where they strike flashing and then flow radially outward between the deflector ring and an outer screen pack, through the outer screen pack and finally exit port holes in the housing.

U.S. Pat. No. 4,578,247 to Bolleau, discloses a gas generator comprising a housing having two subassemblies each having first and second concentric cylinders joined together by welding to form an igniter chamber and an outer chamber. The outer chamber is divided into three axial chambers, the first of which contains a fuel and the second and third chambers cooling and filtering means.

U.S. Pat. No. 4,590,041 to Hill, discloses a gas generator wherein gas generant pellets are maintained under pressure to improve the duration stability and decrease the degradation of the gas generant pellets. Pressure is applied by a plate that is spring biased against the pellets.

U.S. Pat. No. 4,943,086 to Cunningham, discloses a gas generator having a housing comprising an inner shell welded to an outer shell. Within the housing defined by the shells is an inner combustion chamber in the outer diffuser chamber. The igniter material is contained within a container that is free of attachment to any structural component of the housing, thereby permitting a greater number of apertures to be provided therein or a more diffused pattern of gas flow into the combustion chamber. This eliminates the need for an ignition cup for the igniter powder as the squib may fire directly into the igniter powder and insure greater ignition thereof.

Japanese Patent No. JP 63-301144 to Mizoguchi, discloses a structure of an air bag comprising a lattice configuration or a multiple pillar-shaped configuration so that less air is required for inflation of the air bag.

Japanese Patent No. JP 47-30045 to Kogyo, discloses a rapidly inflatable apparatus for shock absorption comprised of a series of tube-like inflators linked together by a piece of material which accepts an accelerated body after a collision.

Japanese Patent No. JP 50-16057 to Toyota Motor Corporation, discloses an air bag having inner and outer films joined by blocked connecting portions which take on a lattice or wave-like shape to maintain the shape of the bag.

OBJECTS AND SUMMARY OF THE INVENTION

The gas generator for air bags according to the present invention comprises: a housing made up of first and second shells, each shell having a circular part and an outer wall formed along the periphery of the circular part; a gas generating device installed in the housing; openings formed in the first shell for establishing communication between a filter chamber in the housing and an air bag; a partition member for defining an annular space, the annular space being formed between the outer wall of the first shell and a center tube installed at the center of the housing, the partition member having an annular portion which has an inner diameter into which the center tube can be fitted and an outer diameter smaller than the inner diameter of the housing, the partition member also having a cylindrical wall portion that is formed along the outer circumference of the annular portion and extends to the circular part of the first shell; a combustion chamber formed between the annular portion of the partition member and the circular part of the second shell; and a filter chamber formed between the cylindrical wall portion of the partition member and the outer wall of the first shell in such a way that the filter chamber overlaps the combustion chamber in the axial direction along the outer circumference of the combustion chamber and the filter chamber communicates with the combustion chamber; whereby gases produced by the gas generator on receiving an impact are introduced axially upward from the combustion chamber, through the filter chamber and into the air bag to protect a passenger from the impact.

In this gas generator, spaces, which in a conventional gas generator are arranged side by side with the combustion chamber in the radial direction, are disposed axially overlapping the combustion chamber, thereby reducing the housing diameter and the overall size of the gas generator. Reduction in the housing diameter obviates the need of a reinforcement member or rivets.

Accordingly, it is an object of the present invention to provide a gas generator that is compact in size.

It is another object of this invention to provide a gas generator that utilizes the wasted space in conventional gas generators.

It is a further object of this invention to provide a gas generator wherein space made available by obviating the use of rivets is utilized to accommodate a gas generant, a coolant and a filter.

It is an even further object of this invention to provide a gas generator wherein the gas passage is long and curved to provide a pressure loss and improve the filtering and cooling efficiencies of the device.

It is yet another object of this invention to provide a ga generator having internal components arranged in a vertical stack relationship.

It is even another object of this invention to provide a gas generator that is relatively smaller, lighter and less expensive to manufacture.

It is still another object of this invention to provide a gas generator wherein combustion gas has an axial flow therethrough.

It is even another an object of this invention to provide a novel small gas generator for air bags that overcomes the problems of the prior art.

BRIEF DESCRIPTION OF THE DRAWINGS

These and further objects of the present invention will become apparent to those skilled in the art from review of the following Detailed Description of the Invention and accompanying drawings in which.

DESCRIPTION OF THE PREFERRED EMBODIMENT

Figure 1:
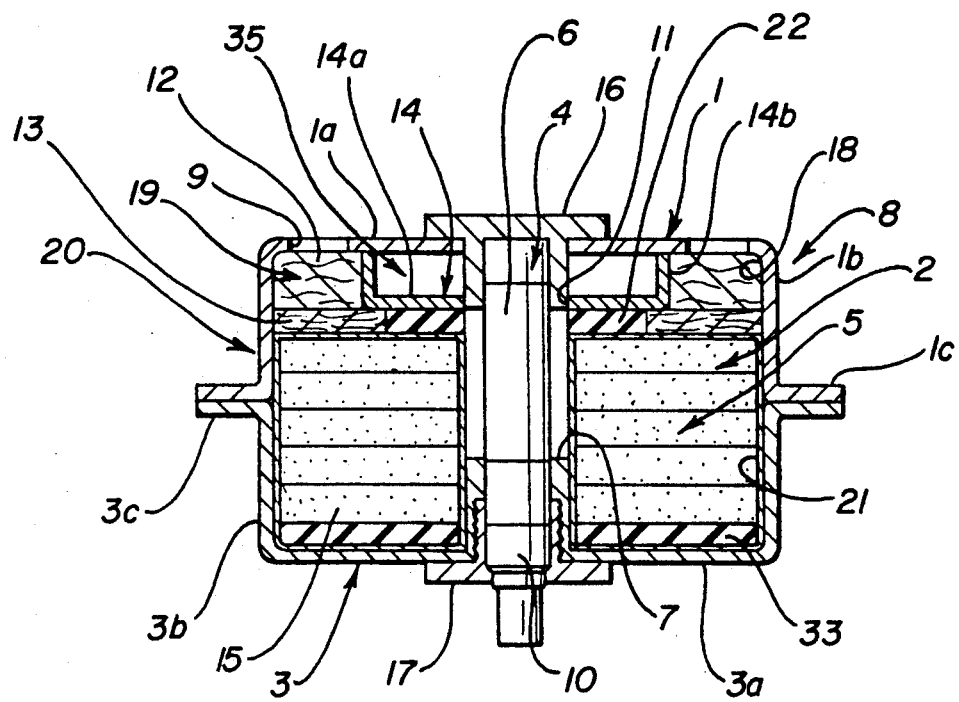
FIG. 1 is a cross-sectional view of one preferred embodiment of the gas generator of the present invention.

Referring to FIG. 1, the housing 20 of the gas generator 8 of the present invention comprises a first shell or a diffuser shell 1 and a second shell or a closure shell 3. The diffuser shell 1 and the closure shell 3 each comprise a circular part 1a, 3a respectively and an outer wall 1b, 3b respectively formed around the periphery of the circular part.

The diffuser shell 1 and the closure shell 3 have flange portions 1c, 3c respectively formed at the front end of each outer wall. Flange portions 1c and 3c are welded together to join the diffuser shell 1 and the closure shell 3 along the outer wall of the housing.

In the housing 20 there is an ignition device chamber 4 positioned at the center of the housing 20 which is defined by center tube 16. The center tube 16 is cylindrical and is positioned in the center of circular part 3a of the closure shell. The center tube 16 is threadably connected to adapter 17. The heads of center tube 16 and adapter 17 are positioned on the exterior of the diffuser and closure shells respectively and join the diffuser shell 1 and the closure shell 3 together at the central portion of the housing.

In an annular space 2 formed by the center tube 16 and the housing 20 there is provided a partition member 14. The partition member 14 comprises an annular portion 14a and a cylindrical wall portion 14b formed integral with the annular portion along its circumference. The annular portion 14a has an opening 11 into which the center tube 16 is fitted. The diameter of the outer circumference of the annular portion 14a is smaller than the inner diameter of the housing, thereby forming an annular space between the cylindrical wall portion 14b and the outer wall 1b of the diffuser shell 1. The top end of the cylindrical wall portion 14b extends to the circular part 1a of the diffuser shell 1 and at its top end surface engages with the inner surface of the circular part 1a.

Between the annular portion 14a of the partition member 14 and the circular part 3a of the closure shell 3 is formed a combustion chamber 5, which is annular in shape, encloses the center tube 16 and extends to outer walls 1b and 3b of the diffuser and closure shells 1 and 3. A filter chamber 19 is formed between the cylindrical wall portion 14b of the partition member 14 and the outer wall 1b of the diffuser shell 1 so that the filter chamber 19 overlaps the combustion chamber 5 in a portion of the axial direction along the circumferential portion of the combustion chamber 5. The filter chamber 19 communicates with the combustion chamber 5 by means of a gap 18. Since the outer diameter of the annular portion 14a of the partition member 14 is smaller than the inner diameter of the housing 20, the gap 18 is formed because of the difference between the diameters. The gap 18 constitutes an outlet through which the burning gases in the combustion chamber flow.

The diffuser shell 1 has openings 9 in the circular part 1a through which the filter chamber 19 communicates with the interior of an air bag (not shown). A plurality of these openings 9 are arranged near and along the outer circumference of the circular part 1a. It should be noted that the openings 9 may be provided at a base portion 8 of the outer wall 1b instead of being formed in the circular part.

In the ignition device chamber 4 are installed an enhancer (transfer charge) 6 and a squib (igniter) 10 that form an ignition device. The transfer charge 6 is loaded in the center tube 16, and the squib 10 is loaded in an adapter 17 that fits in the center tube 16. The center tube 16 is formed with an opening 7 to transfer the flame of the priming charge to the combustion chamber 5.

Installed in the combustion chamber 5 is a canister 21. The canister is typically an annular thin container made of aluminum containing a gas generant 15. The canister is held between the annular portion 14a of the partition member 14 and the circular part 3a of the closure shell 3 by means of a cushion 22. In the canister 21 the gas generant 15 is resiliently held by a cushion 33.

Arranged along side of the cushion 22 is a slag filter 13. The slag filter 13 extends between the canister 21 and the filter chamber 19. A cooling filter 12 is installed in the filter chamber 19.

When a sensor (not shown) is activated by an impact, the squib 10 is ignited to fire the transfer charge 6. The resulting high-pressure, high-temperature flame passes through the opening 7, breaking through the wall of the canister 21 filled with the gas generant to fire the gas generant therein. The gases produced in the canister 21 pass through the slag filter 13, whereby the burning gases are cleared of solid substances. The cleaned gases further move through the gap 18 into the filter chamber 19 where the burning gases are cooled as they pass through the cooling filter 12, and then flow through the openings 9 uniformly into the air bag.

Figure 2:
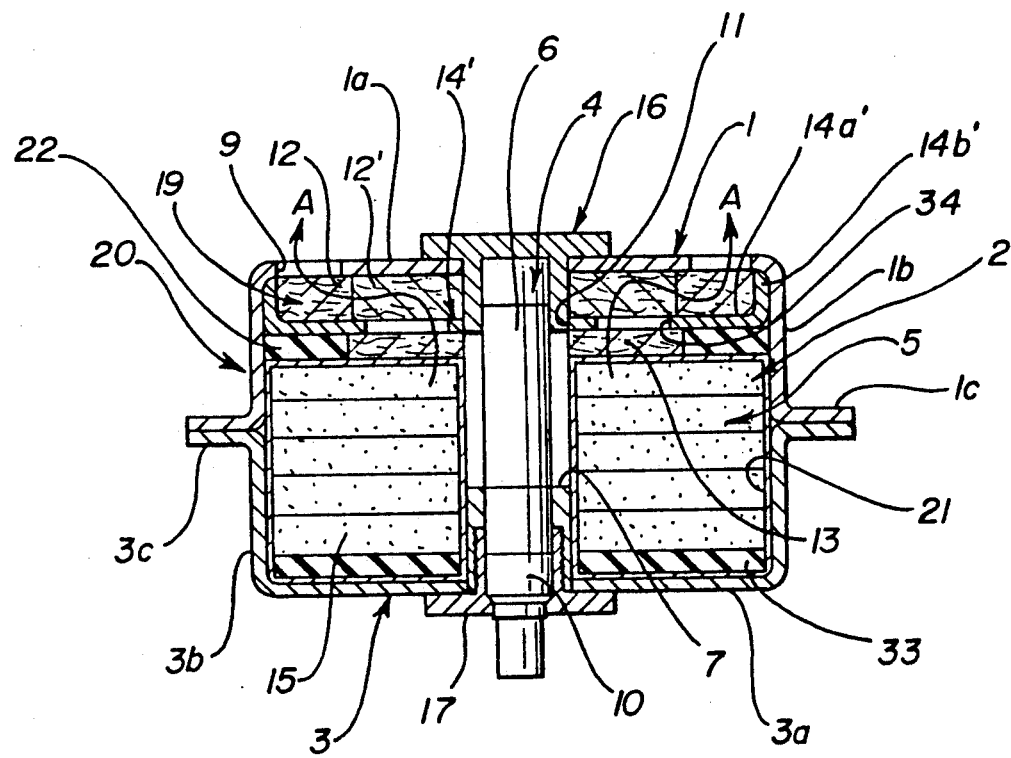
FIG. 2 is a cross-sectional view of another embodiment of the gas generator according to the present invention.

FIG. 2 shows a cross section of another preferred embodiment of the gas generator according to the present invention. In FIG. 2, similar components to those of Figure are represented by similar reference numerals. What is shown in FIG. 2 differs from the gas generator shown in FIG. 1 in the construction of the partition member. The partition member 14' comprises an annular portion 14a' and a cylindrical wall portion 14b' formed integral with the annular portion along its circumference. The annular portion 14a' has an opening 11 in which the center tube 16 is fitted. The outer diameter of the annular portion 14a' is equal to the inner diameter of the housing. The annular portion 14a' also has a plurality of openings 34 arranged in the circumferential direction at an inner circumferential portion thereof. The cylindrical wall portion 14b' extends to and engages with the circular part 1a of the diffuser shell 1.

Formed between the annular portion 14a' of the partition member 14' and the circular part 3a of the closure shell 3 is a combustion chamber 5, which is annular in shape and encloses the center tube 16. A filter chamber 19 is formed between the annular portion 14a' and the circular part 1a of the diffuser shell 1 in such a way that it overlaps the combustion chamber 5 in the axial direction of the combustion chamber 5. The combustion chamber 5 and the filter chamber 19 communicate with each other through the plurality of openings 34. A plurality of openings 9 are formed in the circular part 1a of the diffuser shell 1 to allow the filter chamber 19 to communicate with the air bag (not shown). The openings 9 are arranged about the circumference of the circular part 1a near the outer circumference thereof.

The slag filter 13 and the cushion 22 are arranged along side of each other in reverse position to the arrangement of the gas generator of FIG. 1, to effectively utilize the openings 34. Cooling filters 12 and 12' are of a volume larger than that of the gas generator of FIG. 1, and are installed in the filter chamber 19.

In the gas generator of FIG. 2, the idle space 35 of the gas generator shown in FIG. 1 is utilized to elongate the gas passage and allow for the installation of an additional cooling filter in the passage thereby increasing the volume of the cooling filter. With the gas inlet and the outlet to and from the filter chamber staggered in the radial direction, the gas passage is bent. Therefore, the gas flow as indicated by the arrows A is curved, so that a pressure loss occurs, improving the filtering and cooling efficiencies. This in turn permits a reduction in the volume of the filter chamber therefore reducing the height and size of the gas generator. Further, since the gas nozzles (openings 9) are formed in the circular part of the first shell (diffuser shell 1), they can easily be punched by pressing.

Figure 3:
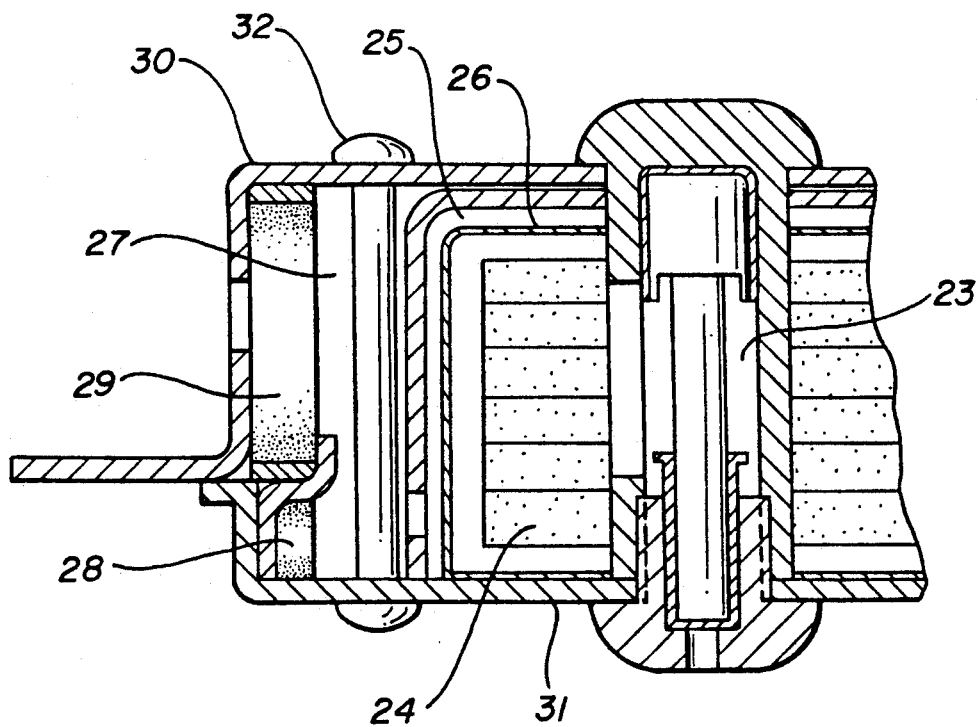
FIG. 3 is a partial cross-sectional view of a conventional gas generator.

The conventional arrangement of the components of a conventional gas generator, shown in FIG. 3 labelled "PRIOR ART" shows circumferential arrangement of components as well as the heavy rivets 32 required to secure the first and second shells of the gas generator together.

Since the combustion chamber and the filter chamber are arranged so that they overlap in the axial direction, the outer diameter of the gas generator can be reduced, leading to a reduction in the size of the gas generator.

Because of this construction, there is no need for rivets or a reinforcing member, resulting in a corresponding reduction in weight and idle space in the gas generator. This permits the available space to be used as a chamber for accommodating the gas generant and filter. As a result, a desired amount of gas generant can be contained in the gas generator without increasing the generator volume.

It is important to note that only a small weld is needed about the flange portions of the diffuser and closure shells because of the threaded connection of the center tube to the adapter and also because the flow path of gas is in the axial direction. Thus, greater efficiency is achieved allowing for the use of a less volatile charge. Further, the gas generator can be made smaller, lighter, thinner and less expensively.

Also, because gas flows axially from the generator, the air bag may be attached to the axial projection of the gas generator thereby further reducing the radial space required for operation of the system.

Additionally, because of the reduced size of this gas generator, it may be used to guard against injuries caused by side impacts. As such, this device could be placed where conventional devices are too large to be placed, ie. a car door.

Having thus described the invention in detail, it is understood that the foregoing description is not intended to limit the spirit and scope thereof. What is desired to be protected by Letters Patent is set forth in the appended claims.

What is claimed is:

1. A gas generator for air bags comprising:
   a housing having a center comprising first and second shells, each shell having a circular part and an outer wall, the outer wall formed along the periphery of the circular part;
   a gas generating device installed in the housing;
   a plurality of openings formed in the first shell for establishing communication between the gas generator and an air bag;
   a partition member for defining an annular space, the annular space being formed in the housing about a center tube installed at the center of the housing;
   the partition member having an annular portion which has an inner diameter into which the center tube can be fitted and an outer diameter smaller than an inner diameter of the housing;
   the partition member also having a cylindrical wall portion that is formed along an outer circumference of the annular portion and extends to the circular part of the first shell;
   a combustion formed between the annular portion of the partition member and the circular part of the second shell, the combustion chamber having an outer circumference; and
   a filter chamber formed between the cylindrical wall portion of the partition member and the outer wall of the first shell so that the filter chamber partly overlaps the combustion chamber in the axial direction along the outer circumference of the combustion chamber;
   the combustion chamber, filter chamber and plurality of openings formed in the first shell are disposed and coact so that gases produced by the gas generating device in the combustion chamber flow axially from the combustion chamber, through the filter chamber and out the plurality of openings to be introduced into the air bag.

2. The apparatus of claim 1 wherein
   the center tube is cylindrical and includes a head; and
   an adaptor having a head;
   wherein, the center tube is threadably engageable with the adaptor and the heads of the center tube and adaptor are positioned on an exterior of the first and second shells to join the first shell and the second shell together.

3. The apparatus of claim 2 wherein the plurality of openings formed in the first shell for establishing communication between the filter chamber and the air bag are formed in the circular part of the first shell and positioned near the outer circumference thereof.

4. The apparatus of claim 3 further including a cushion positioned between the combustion chamber and the partition member to support a canister filled with a gas generant.

5. The apparatus of claim 4, wherein a slag filter is positioned between the canister and the filter chamber and is arranged circumferentially about the cushion.

6. The apparatus of claim 5, wherein a cooling filter is installed in the filter chamber.

7. A gas generator for air bags comprising:
   a housing comprising a first and a second shell, each shell having a circular part and an outer wall, the outer wall formed along the periphery of the circular part;
   a gas generating device installed in the housing;
   a plurality of openings formed in the first shell near an outer circumference of the circular part for establishing communication between the gas generator and an air bag;
   a partition member formed in the housing for defining an annular space,
   the partition member having an annular portion which has an inner diameter into which a center tube can be fitted and an outer diameter equal to the inner diameter of the housing,
   the annular portion of the partition member having a plurality of openings formed near and extending about an inner circumference thereof;
   a combustion chamber formed between the annular portion of the partition member and the circular part of the second shell; and
   a filter chamber formed between the annular portion of the partition member and the circular part of the first shell so that the filter chamber overlaps the combustion chamber in the axial direction;
   the plurality of openings in the partition member and the plurality of the openings in the first shell disposed and coacting with the combustion chamber and filter chamber so that gases produced by the gas generating device travel in a curved path from the combustion chamber into the filter chamber, through the plurality of openings along the inner circumference of the annular portion, out the filter chamber through the plurality of openings in the first shell near the outer circumference of the circular part, to be introduced into the air bag.

8. The apparatus of claim 7 wherein
   the center tube is cylindrical and includes head; and
   and adaptor having a head;
   wherein, the center tube is threadably engageable with the adaptor and the heads of the center tube and adaptor are positioned on an exterior of the first and second shells to join the first shell and the second shell together.

9. The apparatus of claim 8 further including a cushion positioned between the combustion chamber and the partition member to support a canister filled with a gas generant.

10. The apparatus of claim 9, wherein a slag filter is positioned between the canister and the filter chamber, circumferentially about the center part extending over the plurality of openings formed in the annular portion of the partition member.

11. The apparatus of claim 10 wherein the cushion is disposed circumferentially about the slag filter.

12. The apparatus of claim 11, wherein a cooling filter is installed in the filter chamber.

13. A gas generator for air bags comprising:
a housing having a center comprising first and second shells, each shell having a circular part and an outer wall, the outer wall formed along the periphery of the circular part;
a gas generating device installed in the housing;
a filter chamber in the housing;
a plurality of openings formed in the first shell for establishing communication between the filter chamber and an air bag;
a partition member for defining an annular space,
the annular space being formed in the housing about a center tube installed at the center of the housing,
the partition member having an annular portion which has an inner diameter into which the center tube can be fitted;
a combustion chamber formed between the partition member and the circular part of the second shell; and
the filter chamber formed between the partition member and the first shell so that the filter chamber overlays the combustion chamber in the axial direction;
the combustion chamber, filter chamber and plurality of openings in the first shell disposed and coacting so that gases produced by the gas generating device flow axially from the combustion chamber, through the filter chamber to be introduced into the air bag.

14. The apparatus of claim 13 wherein:
the center tube is cylindrical and includes head; and
an adaptor having a head;
wherein, the center tue is threadably engageable with the adaptor and the heads of the center tube and adaptor are positioned on an exterior of the first and second shells to join the first shell and the second shell together at the central portion of the housing.

15. The apparatus of claim 14 wherein the plurality of openings formed in the first shell for establishing communication between the filter chamber and an air bag are formed in the circular part of the first shell and positioned near the periphery thereof.

16. The apparatus of claim 15 further including a cushion positioned between the combustion chamber and the partition member to support a canister filled with a gas generant.

17. The apparatus of claim 16, wherein a slag filter is positioned between the canister and the filter chamber.

18. The apparatus of claim 17, wherein a cooling filter is installed in the filter chamber.

* * * * *